United States Patent
Faust et al.

(10) Patent No.: US 7,927,020 B2
(45) Date of Patent: Apr. 19, 2011

(54) DECOUPLING DEVICE FOR MOUNTING A SHAFT ON A BASE AND RADIAL ONDULAR WASHER

(75) Inventors: Hartmut Faust, Bühl (DE); Oswald Friedmann, Lichtenau (DE); André Linnenbrügger, Bühl (DE); Ronald Glas, Achern (DE); Christian Bauer, Lauf (DE); Hans-Walter Wodtke, Werdohl (DE)

(73) Assignee: LuK Lamellen und Kupplungsbau Betelligungs KG, Bühl (DE)

( * ) Notice: Subject to any disclaimer, the term of this patent is extended or adjusted under 35 U.S.C. 154(b) by 0 days.

(21) Appl. No.: 12/316,319

(22) Filed: Dec. 11, 2008

(65) Prior Publication Data
US 2009/0103846 A1    Apr. 23, 2009

Related U.S. Application Data

(62) Division of application No. 10/505,924, filed as application No. PCT/DE03/00576 on Feb. 25, 2003, now Pat. No. 7,478,952.

(30) Foreign Application Priority Data

Feb. 28, 2002    (DE) .................... 102 08 995

(51) Int. Cl.
*F16C 27/00* (2006.01)
*F16C 27/04* (2006.01)
(52) U.S. Cl. ........................................ 384/535; 384/581
(58) Field of Classification Search ................. 384/535, 384/536, 539, 581, 582
See application file for complete search history.

(56) References Cited

U.S. PATENT DOCUMENTS

| | | | | |
|---|---|---|---|---|
| 1,423,950 | A | * | 7/1922 | Leon ............................. 384/535 |
| 3,976,340 | A | * | 8/1976 | Pitner .......................... 384/581 |
| 5,062,721 | A | * | 11/1991 | Chiba .......................... 384/536 |
| 6,655,847 | B2 | * | 12/2003 | Obara et al. ................. 384/535 |

* cited by examiner

*Primary Examiner* — Justin Krause
(74) *Attorney, Agent, or Firm* — Alfred J. Mangels

(57) ABSTRACT

A decoupling device for the bearing arrangement of a shaft carried in a housing, in particular a shaft of a belt-driven conical-pulley transmission with a chain that functions as the belt. The decoupling device includes an outer bearing ring configured with a circularly cylindrical outer surface and within which the shaft is mounted, and an inner surface of a housing that encloses the bearing ring outer surface. At least one radial ondular washer is arranged between the bearing ring outer surface and the housing inner surface, which allows a limited relative radial movement between the housing inner surface and the bearing ring outer surface by elastic deformation of the washer.

4 Claims, 12 Drawing Sheets

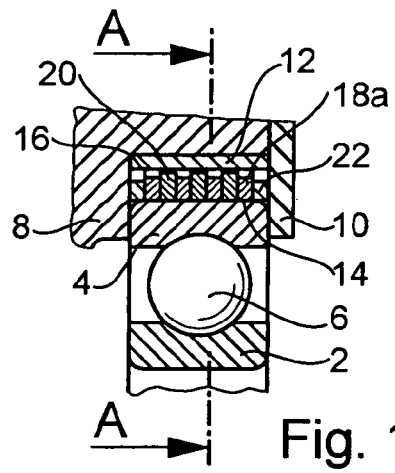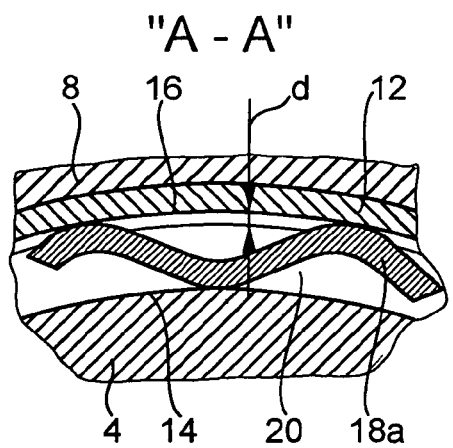
Fig. 1    Fig. 2
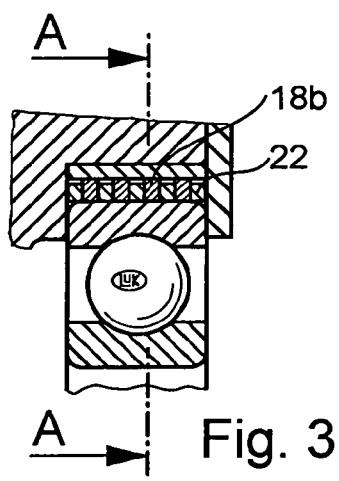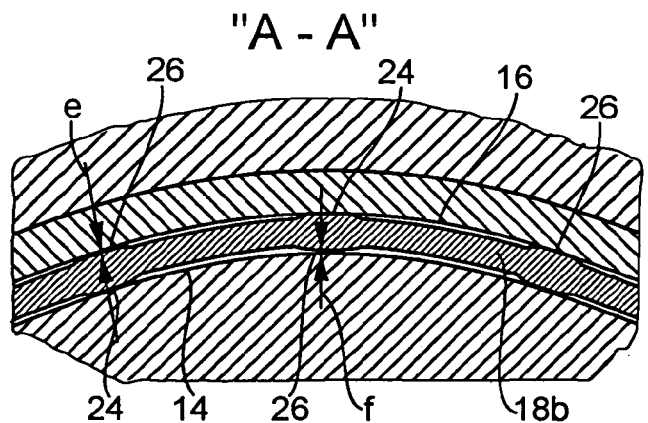
Fig. 3    Fig. 4
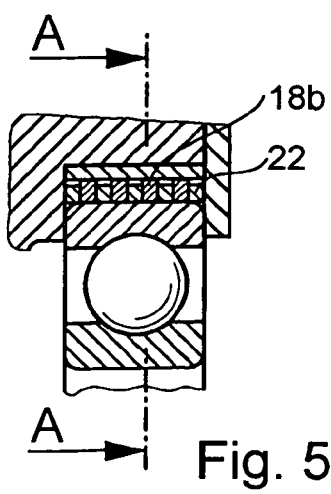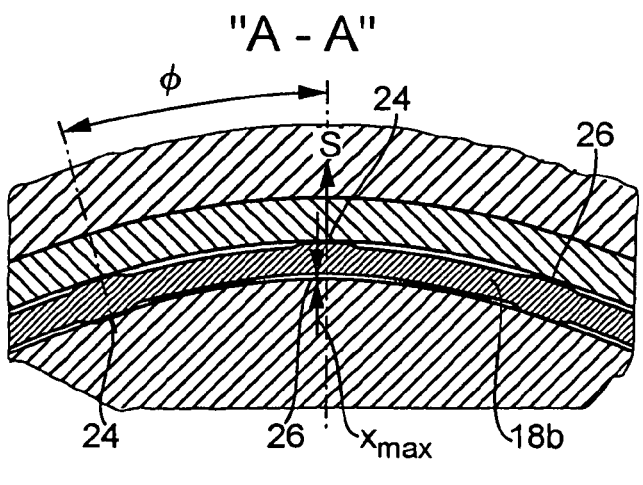
Fig. 5    Fig. 6

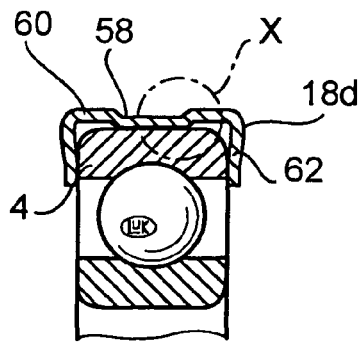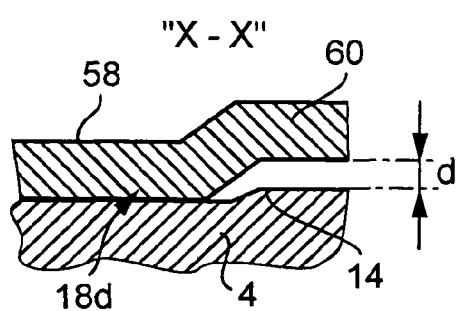
Fig. 34    Fig. 35
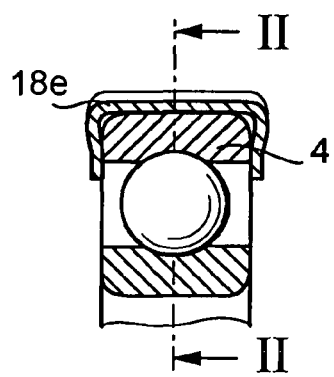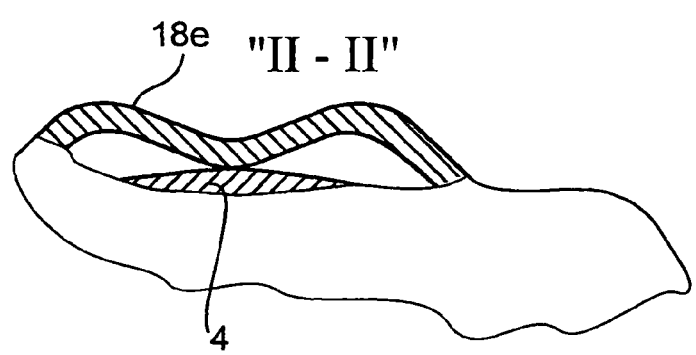
Fig. 36    Fig. 37

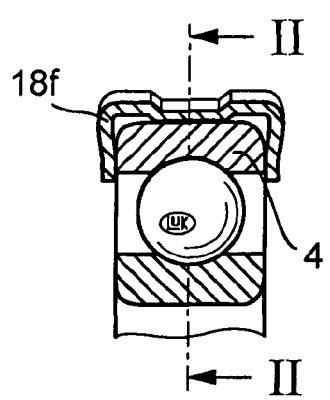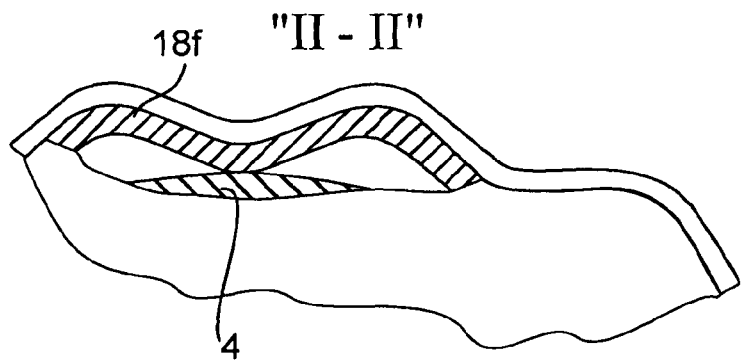
Fig. 38
Fig. 39
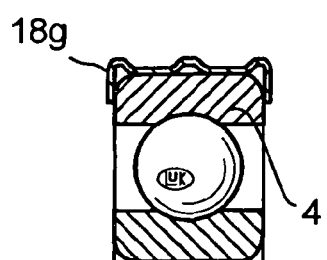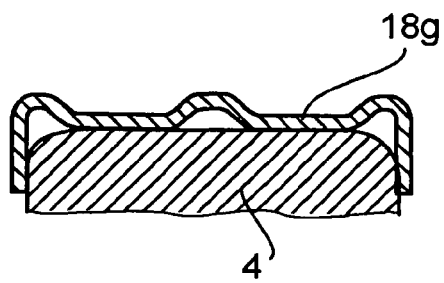
Fig. 40
Fig. 41

DECOUPLING DEVICE FOR MOUNTING A SHAFT ON A BASE AND RADIAL ONDULAR WASHER

CROSS-REFERENCE TO RELATED APPLICATIONS

This application is a division of application Ser. No. 10/505,924, filed on May 31, 2005, which is the U.S. national phase of International Application Serial No. PCT/DE03/00576, with an international filing date of Feb. 25, 2003, and designating the United States, the entire contents of which is hereby incorporated by reference to the same extent as if fully rewritten.

BACKGROUND OF THE INVENTION

1. Field of the Invention

The present invention concerns a decoupling device for mounting a shaft in a bearing carried in a housing, in particular a shaft of a CVT transmission that has a chain that functions as the endless torque-transmitting means. The invention also concerns a radial ondular washer for such a decoupling device.

2. Description of the Related Art

Belt-driven conical-pulley transmissions with a continuously variable transmission ratio have been used lately increasingly more frequently in motor vehicles. Such belt-driven conical-pulley transmissions include two pairs of conical disks mounted on shafts installed with a mutual spacing, around which is wound in frictional engagement with the conical surfaces of the conical disk pairs an endless torque-transmitting means. The transmission ratio of the transmission can be changed continuously by changing the spacing between the pairs of endless torque-transmitting means by moving them in mutually opposite directions. Metallic chains are used as endless torque-transmitting means, in particular in transmissions with which higher torques can be transmitted, for example, torques within the range of 300 Nm and higher.

It is an object of the present invention to reduce the noise transmission, in particular the transmission of structure-borne noise, from the endless torque-transmitting means into the interior of the motor vehicle.

SUMMARY OF THE INVENTION

The object is achieved with a decoupling device for the bearing arrangement of a shaft carried in a housing, in particular a shaft of a belt-driven conical-pulley transmission with a chain that functions as the belt. The decoupling device includes an outer bearing ring configured with a circularly cylindrical outer surface and within which the shaft is mounted, and an inner surface of a housing that encloses the bearing ring outer surface. At least one radial ondular washer is arranged between the bearing ring outer surface and the housing inner surface, which allows a limited relative radial movement between the housing inner surface and the bearing ring outer surface by elastic deformation of the washer.

Advantageous embodiments and further developments of the decoupling devices in accordance with the invention are mentioned by way of example below, but those examples are not exclusive.

At least two radial ondular washers are arranged axially side by side at a mutual spacing. A stop ring is arranged between the radial ondular washers and is configured in such a way that it comes into contact with the housing inner surface and the bearing ring outer surface after a predetermined relative radial movement between the bearing ring outer surface and the housing inner surface, and thereby prevents any further relative radial movement.

The radial ondular washer is configured with internal and external support humps, which are in constant contact with the bearing ring outer surface or the housing inner surface.

The radial ondular washer is also provided with stop humps on its inner surface and/or its outer surface, so that there is a clearance between the stop humps and the bearing ring outer surface or the housing inner surface in the case of a centered arrangement of the inner surface relative to the outer surface.

The heights of the stop humps differ in such a way that, in the case of a radial displacement of the bearing ring outer surface relative to the housing inner surface, several stop humps, which are mutually spaced in the peripheral direction, come into contact with the bearing ring outer surface or the housing inner surface.

A positioning device is provided, by means of which at least one radial ondular washer is fixed in the peripheral direction.

The radial ondular washers are slotted, and the positioning device includes a component that engages with the slot of the radial ondular washers and with a recess formed in the housing inner surface.

In another embodiment, the radial ondular washers are similarly slotted, and the positioning device is provided by an extension formed on the housing inner surface or the bearing ring outer surface, and which engages with the slot of the radial ondular washers.

The slot of the radial ondular washers is arranged in such a way relative to the humps that are configured on the inside and/or the outside of the radial ondular washers, that the humps of two adjacent radial ondular washers, which are mutually rotated by 180°, are offset relative to each another in the circumferential direction.

The slot runs obliquely with respect to the radial direction.

The radial ondular washers are slotted and the positioning device is configured in such a way that the radial ondular washers end in axially-extending pegs in the direction of the slot, wherein the peg of an axially outermost radial ondular washer engages with a recess formed in the housing, and the pegs of inner radial ondular washers each engage with the slot of an adjacent radial ondular washer.

The bearing ring outer surface and/or the housing inner surface is provided with a groove in which at least one radial ondular washer is inserted.

On at least one axial edge of the bearing ring outer surface and the housing inner surface is formed a radially-extending lateral surface, and at least one supporting component is provided, by means of which the lateral surfaces are mutually supported.

At least one radial ondular washer is provided with both radial and axial undulations and limits the axial displaceability between the bearing ring outer surface and the housing inner surface.

On the bearing ring outer surface and lateral surfaces running radially thereto is fitted a sleeve with an overall U-shaped cross section, and between the sleeve and the bearing ring outer surface is arranged at least one radial ondular washer.

The radial side surfaces of the bearing ring outer surface are mutually radially supported in the axial direction in an elastically flexible manner on radial side surfaces of the housing inner surface via the overall radially-extending, curved side walls of the sleeve The side walls of the sleeve are supported in an axial direction via at least one axially flexible radial ondular washer in an elastically flexible manner on the component formed with the outer surface.

A spring sleeve that forms the radial ondular washer having an overall U-shaped cross section is fitted on the bearing ring outer surface and side surfaces extending radially with respect thereto, whose overall axis-parallel extending base bulges out radially.

The base of the spring sleeve has at least two axially-spaced circumferential radial undulations having an axial undulation length direction.

An annular region extends between the radial undulations into a circumferential recess of the bearing ring outer surface.

The base of the spring sleeve has at least one radial undulation in a circumferentially-extending undulation direction.

The radial undulations of the base with axially- and/or circumferentially-extending undulation directions have different heights.

Radial side surfaces of the bearing ring outer surface are mutually radially supported in the axial direction in an elastically flexible manner on radial side surfaces of the housing inner surface via the overall radially-extending, curved side walls of the spring sleeve.

The radial side walls of the spring sleeve are supported radially on an annular shoulder on radial side walls of the bearing ring outer surface, and the base of the spring sleeve resting on the housing inner surface is formed in a curved shape.

The spring sleeve is formed with radial slots that cut through the base wall.

A peripheral projection of the base engages with an annular groove of the inner surface.

An annular surface is configured on at least one side surface, which axially limits the inner surface and runs radially inward, and on which the spring sleeve is axially supported.

The side walls of the spring sleeve are formed so as to be axially and/or radially elastically flexible.

The radial ondular washer is formed by spring segments that extend over parts of the periphery of the housing inner surface or the bearing ring outer surface.

The at least one radial ondular washer is arranged on a radially loaded side of the bearing arrangement and extends only over part of the periphery, and a positioning device is provided, which fixes the positioning of the at least one radial ondular washer in the peripheral direction.

Examples of advantageous embodiments of radial ondular washers in accordance with the invention are described below, which can be installed in the decoupling device in accordance with the invention.

A radial ondular washer for surrounding at least part of the periphery of a circularly cylindrical bearing ring outer surface has circumferentially-spaced supporting humps on the radial outer surface and on the radial inner surface for providing a permanent contact with the bearing ring outer surface and a housing inner surface that is concentric with respect to the bearing ring outer surface and surrounds the bearing ring outer surface.

A radial ondular washer for surrounding at least part of the periphery of a circularly cylindrical outer surface has circumferentially-spaced stop humps on the radial outer surface and on the radial inner surface for providing contact with the bearing ring outer surface and a housing inner surface that is normally concentric with respect to the bearing ring outer surface and surrounds the outer surface after a predetermined radial displacement of the bearing ring outer surface relative to the housing inner surface.

The humps can merely be formed by the undulations of the radial ondular washer.

A radial ondular washer configured with humps has a slot that is arranged in such a way relative to the humps that, if two axially adjacent radial ondular washers are rotated with respect to each other by 180° and with their slots facing each other, the corresponding humps are offset with respect to each other.

The above-described slot extends transversely relative to the radial direction.

The radial ondular washer is provided with radial and axial arched regions.

A radial ondular washer for surrounding at least part of the periphery of a bearing ring that is formed with a circularly cylindrical outer surface and radial side surfaces adjacent thereto, is formed as a spring sleeve with an overall U-shaped cross section that surrounds at least one peripheral segment of the bearing ring, wherein at least the base of the spring sleeve has an elastically deformable arched region.

The base of the above-described radial ondular washer is formed with a radial projection that extends in the peripheral direction.

The decoupling device in accordance with the invention and the radial ondular washer or springs in accordance with the invention can be installed in any kind of bearing arrangement. They are advantageously installed in roller bearings, wherein, for example, the shafts of a belt-driven conical pulley transmission are mounted with such roller bearings.

BRIEF DESCRIPTION OF THE DRAWINGS

The invention will be described in detail below by way of example with reference to the drawings, wherein:

FIGS. 1, 3, 5, 7, 13, 18, 20, 22, 26, 28, 30, 34, 36, 38, 40, 42, 44 and 45 show partial sectional views of bearing arrangements seen cut parallel to the bearing axis;

FIGS. 2, 4, 6, 8, 14, 15, 16, 27, 29, 37, 39 and 43 show partial sectional views of different embodiments of bearing arrangements seen cut perpendicularly to the bearing axis;

FIG. 35 shows an enlarged detail of FIG. 34;

FIG. 41 shows an enlarged detail of FIG. 40;

DESCRIPTION OF THE PREFERRED EMBODIMENTS

Figure 7:
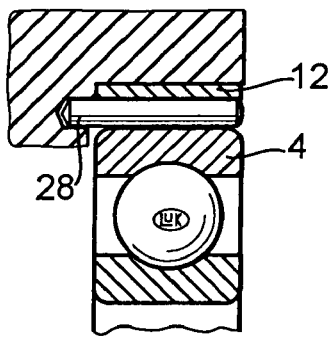

In accordance with FIG. 1, a shaft (not shown) of a pair of conical disks of a belt-driven conical pulley transmission is surrounded by an inner bearing ring 2. Between the bearing ring and an outer bearing ring 4, which is arranged concentrically relative thereto, are arranged roller elements 6, so that components 2, 4, and 6 collectively form a roller bearing. It is understood that the outer surface of the inner bearing ring 2, on which the roller elements 6 roll, can be formed directly by a correspondingly machined outer surface of the shaft (not shown). The outer bearing ring 4 is received in an annular recess of a base 8, for example the housing of the transmission, which is closed on the right by a removable cover 10, as shown in FIG. 1.

The outer surface of the outer bearing ring 4 is not supported directly on the axially-extending wall of the annular recess, but rather by interposing different annular components and by a housing ring 12 optionally fit into the annular recess. More precisely, four ring-shaped radial ondular washers 18a, between which are arranged stop rings 20 to secure the axial spacing, are arranged between the outer surface 14 of the outer bearing ring 4 and the inner surface 16 of the housing ring 12 in the example that is shown. Spacing rings 22 are provided axially outside on both sides.

The stiffness of the radial ondular washers is such that the desired stiffness of the bearing arrangement with respect to radial displacements of the shaft (not shown) is achieved via the four radial ondular washer rings or radial ondular washers. While the radial ondular washers 18a are shaped in such a way that they are constantly in contact with outer surface 14 and with inner surface 16, as shown in FIG. 2, which is a detail view of FIG. 1 as viewed in the direction A-A, the stop rings 20 are dimensioned in such a way that a radial clearance d exists between them and the housing ring 12. In that way, the outer bearing ring 4 in accordance with FIG. 2 can be moved upward over a distance d by elastic deformation of the radial ondular washers 18a until the stop rings 20 come into contact with the housing ring inner surface 16.

The housing ring 12, which is manufactured of steel, for example, is optional and serves, for example, for preventing wear of the recess or the bore of the housing 8, which can be made of a light metal.

In the following exemplary embodiments, which will be described with reference to views similar to those shown in FIGS. 1 and 2, only those components that are essential for the description are provided with respective reference numerals.

While in the case of the exemplary embodiment in accordance with FIGS. 1 and 2 the radial ondular washers 18a have an essentially constant cross section along the periphery and are provided with undulations only in the circumferential direction, the radial ondular washers 18b in accordance with FIGS. 3 and 4 are provided with humps, but only spacing rings 22 are provided between the radial ondular washers 18b and axially on the outside.

As can be seen in FIG. 4, the radial ondular washers 18b are provided with circumferentially-spaced supporting humps 24 on the inside and on the outside, which are formed in such a way that they are in constant contact with the outer surface 14 or the inner surface 16. Between the supporting humps 24 are stop humps 26, so that between the humps 26 and the respective surfaces in the unloaded state of the bearing arrangement there is a clearance e toward the outside, and a clearance f toward the inside. As shown, the stop humps 26 are preferably located on the side of the radial ondular washers 18b opposite to the supporting humps 24. The stop humps 26 act as stops at a certain degree of deformation of the radial ondular washers 18b so that, under high load, the supporting humps and also the stop humps form contact points for supporting the outer bearing ring 4 on the housing 8, whereby a uniform support of the roller bearing is achieved.

FIGS. 5 and 6 show an embodiment of the bearing arrangement or the decoupling of the outer bearing ring 4 from the housing 8 corresponding largely with the one shown in FIGS. 3 and 4, by means of which the transmission of noise from the roller bearing into the housing is reduced. In the embodiment in accordance with FIGS. 5 and 6, the stop humps 26 are formed with different heights. Let it be assumed that the bearing is loaded or radially displaced vertically upward in the direction of the arrow S. If clearances e and f along the periphery are identical, the clearance f is used up completely at the contact point indicated by arrow S, whereas a residual clearance remains between the neighboring stop humps and the respective surfaces, since the approach between those locations corresponding with the peripheral angle φ is less.

To ensure that the stops become effective at the same time, the radial clearances at the individual humps are adapted in accordance with the respective angular position. That leads to a more uniform distribution of the load on the bearing. The following equation applies to the individual clearances:

$x(\varphi) = x_{max} \cdot \cos(\varphi)$, wherein $x_{max}$ is the individual clearance at contact point $S$.

It is advantageous in many regards to fix the radial ondular washers or spring rings in the peripheral direction. The positioning of the radial ondular washers in the peripheral direction can be accomplished in different ways.

Figure 8:
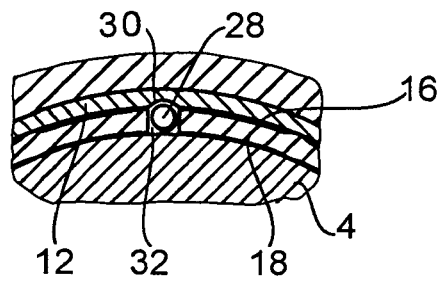

In accordance with FIGS. 7 and 8, a pin 28, which engages a recess 30 on the housing ring 12, additionally engages with an axial slot 32, with which the radial ondular washers 18 are formed. As can be seen immediately, the pin 28 is thus held immovably in the peripheral direction between the outer bearing ring 4 and the housing ring 12, so that it fixes the radial ondular washer 18 in the peripheral direction.

It is advantageous if the undulations or humps of neighboring radial ondular washers are offset relative to each other in the peripheral direction in order to achieve a loading of the bearing that is as uniform as possible. In order to realize a mutual displacement of the radial ondular washers that are fixed in the peripheral direction different radial ondular washers with a different relative arrangement of the slot and humps or undulations would have to be produced. In order to reduce the multitude of variants, it is advantageous to place the slot 32 in such a way between the humps that the desired positioning is achieved with an installation of the radial ondular washers that is alternatively reversed; that is, with an installation of the radial ondular washers rotated by 180°.

Figure 9:
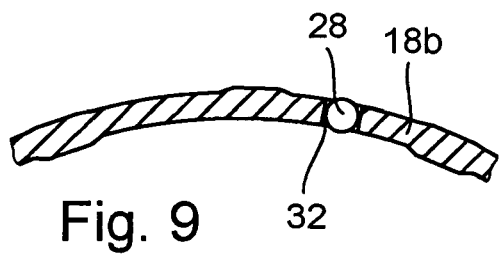
FIGS. 9 and 11 show partial side views of two different embodiments of radial ondular washers.
Figure 10:
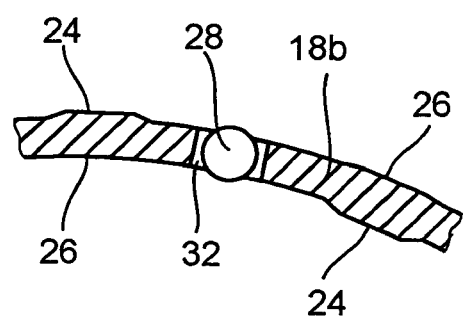
FIGS. 10 and 12 show portions of the views of FIGS. 9 and 11.

It is advantageous to apply the slot 32 centrally between a radially outer supporting hump 24 and a radially inner supporting hump 24 as shown in FIGS. 9 and 10, wherein FIG. 10 shows an enlarged portion of FIG. 9.

As can be seen immediately in FIG. 10, a radially outwardly directed supporting hump 24 is located to the left of the pin 28, and a radially inwardly directed supporting hump 24 is located to the right of the pin 28. In addition, a stop hump 26 is located to the left of the pin opposite the inner supporting hump 24 and directed radially inward, and a stop hump 26 is located to the right of the pin 28, which is located opposite the supporting hump 24 and is directed radially outward. In the case of an installation of the radial ondular washer 18 that is rotated by 180°, a supporting hump is adjacent to a respective stop hump.

It is understood that there are numerous further possibilities of arranging the humps or undulations and the slots, with which a force distribution that is as uniform as possible is obtained with a small variety of components with regard to the radial ondular washer.

Figure 11:
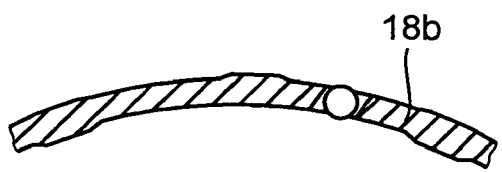
Figure 12:
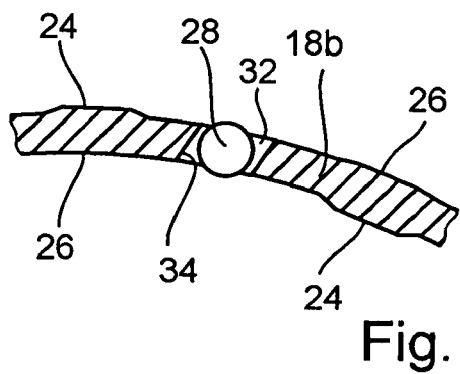

Because of the slight differences in the heights of the humps, it is difficult to determine the correct installation; that is, the respective installation rotated by 180° in the configuration of the radial ondular washers in accordance with FIGS. 9 and 10. That problem can be solved in that as shown in FIGS. 11 and 12 the slot 32 is formed with side walls 34 that are inclined relative to the radial direction. It can be easily seen in that way whether the axially adjacent radial ondular washers are mounted rotated by 180°.

Figure 13:
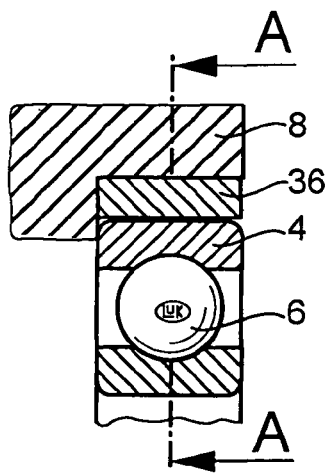
Figure 14:
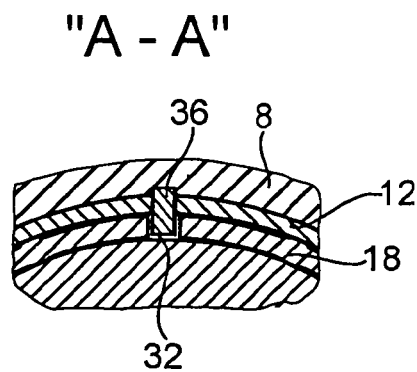

The most widely different possibilities exist for fixing the radial ondular washers 18 circumferentially relative to the housing 8. FIGS. 13 and 14 show a key 36 that is inserted into a groove in the housing 8 and passes through a slot in the housing ring 12 and slot 32 in the radial ondular washer 18.

Figure 15:
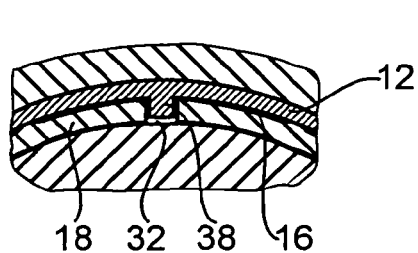

FIG. 15 shows an embodiment in which the housing ring 12 is provided with an inwardly-extending radial fin 38 that engages with the slot 32 of the radial ondular washer 18.

Figure 16:
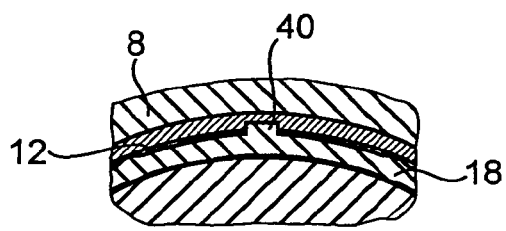

In the exemplary embodiment in accordance with FIG. 16, the radial ondular washer 18 is provided with a radially outwardly extending fin 40, which engages with a recess in the housing ring 12. The housing ring 12 is immovably held on the housing 8 in the circumferential direction.

Figure 17:
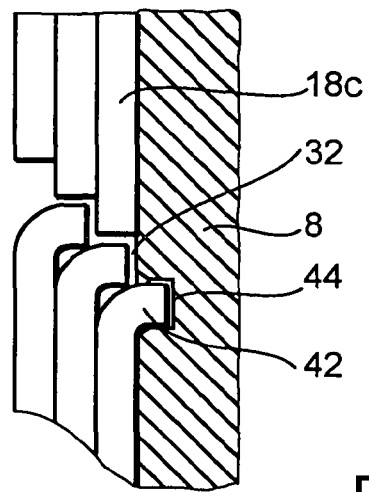
FIG. 17 shows a partial plan view, partially in section, of a bearing arrangement having a special embodiment of radial ondular washers.

An additional arrangement for axially fixing the radial ondular washers is illustrated in FIG. 17. In that embodiment, each radial ondular washer 18c ends in an axially-extending projection or peg 42 on one side of the slot 32. The peg 42 of the axially outermost radial ondular washer engages with a recess 44 that is formed in a radial surface of the housing 8. The pegs 42 of the axially adjacent radial ondular washers each engage with the slot 32 of an adjacent radial ondular washer, on the right hand side as shown in FIG. 17. The radial ondular washer rings can be manufactured inexpensively as stamped flexible components.

Additional advantageous embodiments of devices with which the bearing can be decoupled from the housing are described below with reference to FIGS. 18 through 25.

Figure 18:
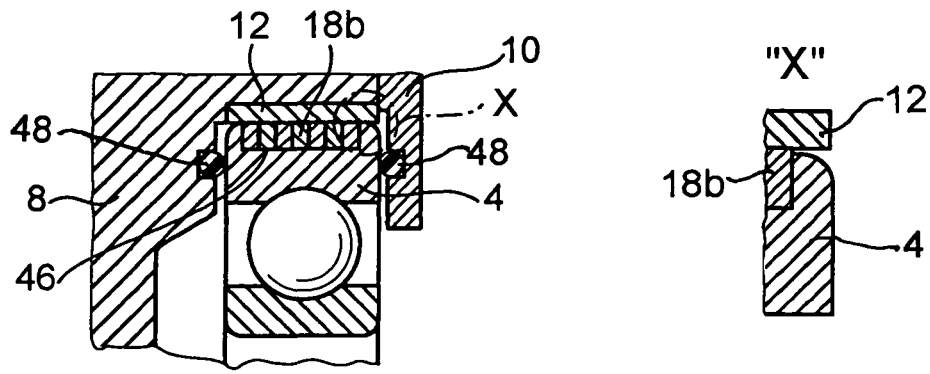
Figure 19:
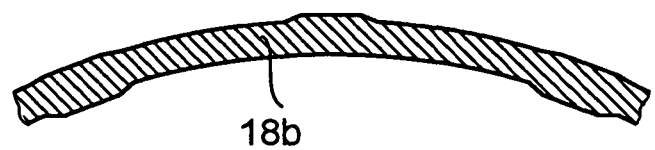
FIGS. 19 and 21 show partial side views of radial ondular washers.

In the embodiment in accordance with FIGS. 18 and 19, the outer surface of the outer bearing ring 4 is provided with a wide peripheral groove 46 in which radial ondular washers 18b are arranged. Radial ondular washers 18b can be preinstalled in a similar manner, for example, like retaining rings that are installed in shaft grooves. The shoulders of the outer bearing ring 4 (shown in enlarged illustration X) that are axially outside of the peripheral groove 46, can directly form a radial stop. In addition, O-rings 48 for the purpose of axial guidance of outer bearing ring 4 can be installed between the side walls of the housing 8 and of the annular cover 10.

Figure 20:
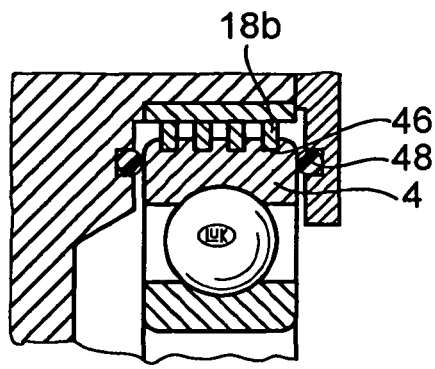
Figure 21:
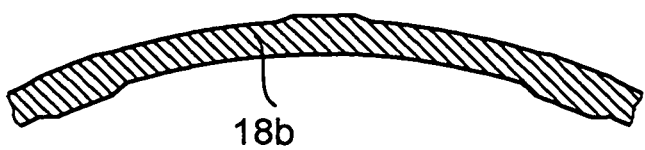

The embodiment in accordance with FIGS. 20 and 21 differs from that of FIGS. 18 and 19 only in that several peripheral grooves 46, in each of which a single radial ondular washer 18b is arranged, are formed in the outer surface of the outer bearing ring 4.

Figure 22:
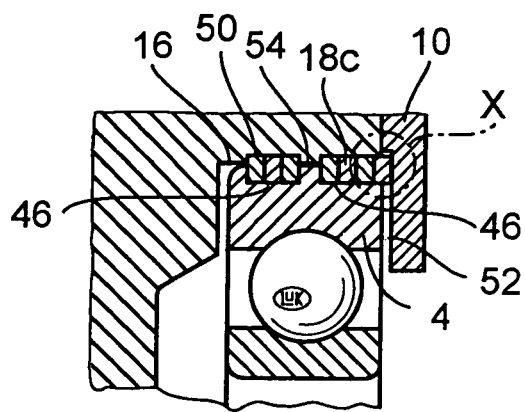
Figure 23:
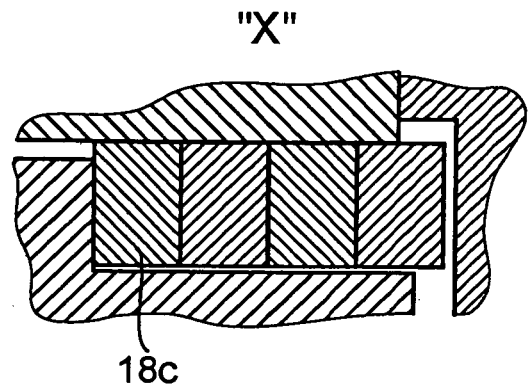
FIG. 23 shows an enlarged detail of FIG. 22.
Figure 24:
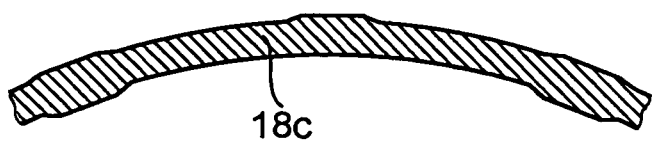
FIG. 24 shows a partial side view of a radial ondular washer.
Figure 25:
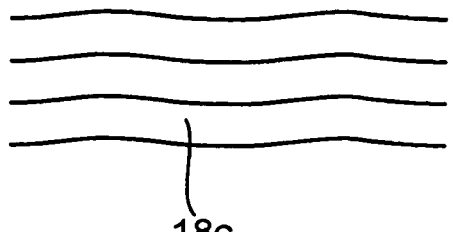
FIG. 25 shows a partial plan view of radial ondular washers arranged side by side.

In the exemplary embodiment in accordance with FIGS. 22 through 25, the outer bearing ring 4 is provided with two peripheral grooves 46, wherein three radial ondular washers 18c are arranged in the left side peripheral groove in accordance with FIG. 22, and four radial ondular washers 18c are arranged in the right side peripheral groove 46. The opposite surface or inner surface 16, which is formed in the housing 8, has a step 50 against which the leftmost radial ondular washer is supported. The axially outermost radial ondular washer 18c in the right side peripheral groove 46 is supported by a radially extending side surface 52 of the annular cover 10. FIG. 23 shows the detail X of FIG. 22 in the form of an enlarged illustration. In terms of their radial span, the individual radial ondular washers 18c are configured with humps in a similar manner, for example, to the embodiment in accordance with FIG. 4 (see FIG. 24). In addition, the radial ondular washers 18c are provided with undulations in the axial direction as can be seen in FIG. 25, which shows a top view of part of the axially adjacent radial ondular washers 18c. An undocking or acoustic decoupling of the bearing from the housing is achieved in the radial and axial directions via the arrangement in accordance with FIGS. 22 through 25. The nose 54 of the outer bearing ring 4, which is formed between the peripheral grooves 46, can be utilized as a stop.

It is understood that the arrangement in accordance with FIGS. 22 through 25 can be modified in many ways in a similar manner as that of the other exemplary embodiments. The number of grooves, the undulations of the radial ondular washers, or their design with humps, the axial and radial guidance, and the stops can each be configured in ways that correspond to the intended purpose by modifying the number of radial ondular washers, grooves, additional axial undulations, the use of O rings, and the like.

Figure 26:
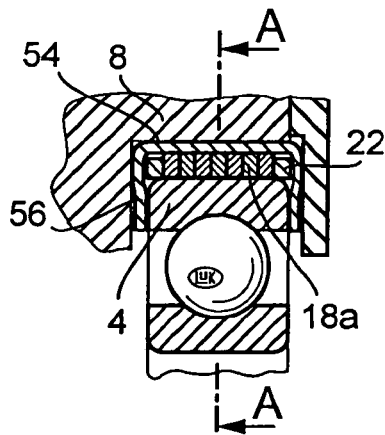
Figure 27:
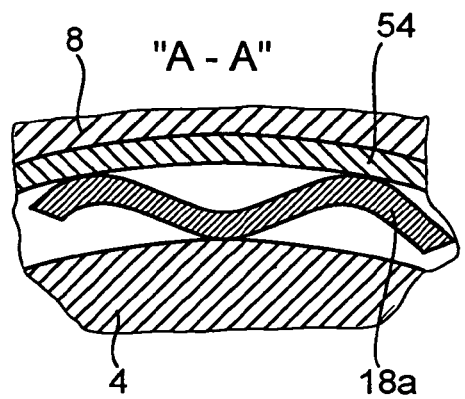

FIGS. 26 and 27 show the arrangement of radial ondular washers 18a between the outer bearing ring 4 and an annular sleeve 54 that is fitted on the outer bearing ring 4, which has, overall, a U-shaped cross section. The radial ondular washers 18a are seated loosely on the outer bearing ring 4 and are held axially by positioning rings 22 that are arranged between the axially outermost radial ondular washers and the radial side walls 56 of the sleeve 54. The sleeve can be produced inexpensively, for example, as a formed sheet metal component, and functions at the same time as an axial spring, similar to a disk spring, due to the arched configuration of the lateral walls 56 in accordance with the intended purpose. In that way, the bearing in accordance with FIGS. 26 and 27 is axially and radially uncoupled from the housing 8.

Figure 28:
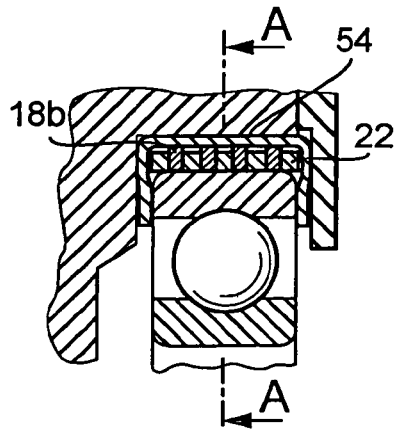
Figure 29:
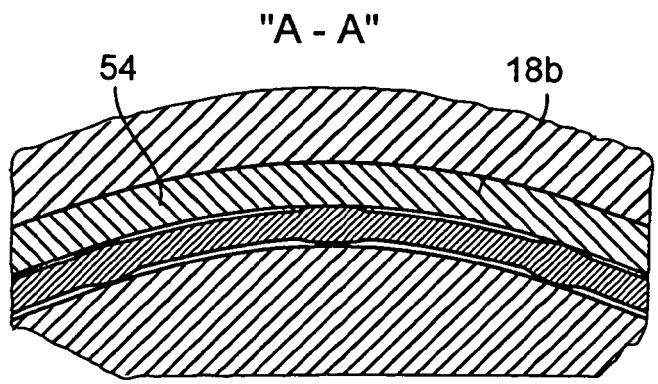
Figure 30:
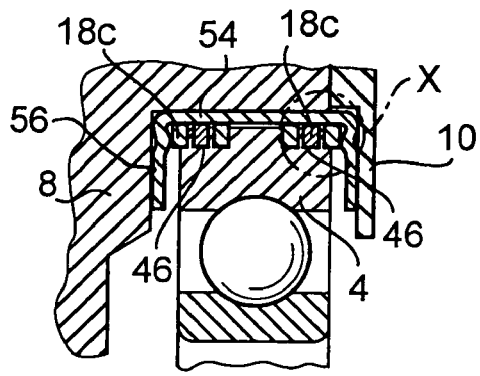

The embodiment in accordance with FIGS. 28 and 29 differs from that of FIGS. 26 and 27 in that radial ondular washers 18b provided with humps are used instead of the radial ondular washers 18a, and in that spacing rings 22 are arranged between each of the radial ondular washers 18b.

Figure 31:
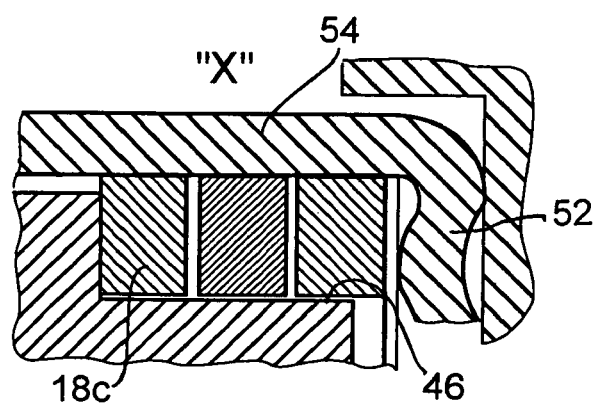
FIG. 31 shows an enlarged detail of region x of FIG. 30.
Figure 32:
FIG. 32 shows a partial side view of a radial ondular washer.
Figure 33:
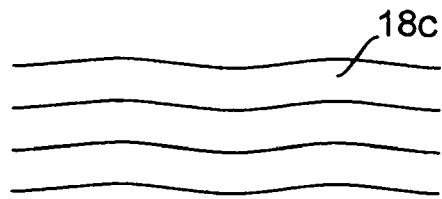
FIG. 33 shows a partial plan view of radial ondular washers arranged side by side.

In the embodiment in accordance with FIGS. 30 through 33, the outer bearing ring 4 is provided with two peripheral grooves 46, which are enclosed by an annular sleeve ring 54, and that open axially outward and in which radial ondular washers 18c are arranged axially and radially. In the case of this embodiment, the sleeve 54 is doubly bent over in the region of the transition from its base to the radially innermost end of side walls 56 and serves for holding the radial ondular washers 18c in an axially and radially preloaded manner. The sleeve itself does not have the function of an axial spring. The function of the axial spring or the axial decoupling is assumed by the radial ondular washers 18c, which are likewise provided with axial undulations. The sleeve 54 serves merely as a stop. FIG. 31 shows the enlarged section X of FIG. 30. FIG. 32 shows a side view of a radial ondular washer 18c, and FIG. 33 shows a top view of a portion of the radial ondular washers 18c, which are arranged side by side and are also provided with axial undulations.

Exemplary embodiments of decoupling devices in which the radial ondular washers are formed by an annular spring shell will be described below with reference to FIGS. 34 through 45.

In accordance with FIG. 34, an annular spring shell 18*d* having an overall U-shaped cross section, surrounds the outer bearing ring 4 in the axial and radial directions. The base 60 of the spring shell 18*d* has a radial undulation with an axial direction undulation arrangement, which is configured in such a way that a peripheral recess 58 is produced, which is visible from the outside. FIG. 35 shows the portion X of FIG. 34 in the form of an enlarged illustration. It can be seen clearly how the outer surface 14 of outer bearing ring 4 is also configured with a flat recess, so that the radial clearance d formed axially outwardly of the recess 58 is smaller between the inner surface of the spring shell 18*d* and the radially outer surface 14 of the outer bearing ring 4 than the radial undulation of the spring shell 18*d*. The clearance d is available for radial displacement of the outer bearing ring, and can be adjusted via the depth of the recess 58 and the height of the undulation in accordance with the intended purpose.

The embodiment in accordance with FIGS. 34 and 35 is characterized relative to the previously described embodiments by its especially simple configuration with only a few parts. It should be understood that the configuration of the outer surface 14 of the outer bearing ring 4 with a circumferential recess or groove is not mandatory. With the aid of the flat recess in the outer surface 14 of the outer bearing ring 4 the height of the arch of the spring sleeve 18*d* can be selected independently from the radial clearance d.

As can also be seen in FIG. 34, the side walls 62 of the spring shell 18*d* can additionally be arched outward, for example, in the region of the transition to the base 60, so that the spring shell assumes the function of an axial spring and a radial spring.

The spring shell 18*d* in accordance with FIG. 34 has a radial arch or undulation in the axial undulation direction. In contrast to this, the spring shell 18*e* of the embodiment in accordance with FIGS. 36 and 37 has a radial undulation with an undulation length or pitch that extends in the circumferential direction, as can be seen in FIG. 37, wherein is shown a fragmentary side view in the direction of the arrows II-II of FIG. 36 of a portion of spring shell 18*e* broken away to show the circumferential undulations. With the embodiment in accordance with FIGS. 36 and 37 the advantage is achieved that a greater elastic flexibility is obtained with the greatest possible undulation lengths.

FIGS. 38 and 39 show a combination of the embodiments of the spring shell in accordance with FIGS. 34 through 37, wherein the spring shell of FIGS. 38 and 39 has an axially-extending radial undulation along with a radial undulation that extends in the circumferential direction. A still greater energy absorption capacity is achieved in that way because of the elastic deformations in larger regions of the material of the spring shell.

FIGS. 40 and 41 show an embodiment of a spring shell 18*g*, which corresponds basically to that of FIG. 34, but has several radial arches with an axial undulation length direction whose heights are different in magnitude. Progressive characteristics can be achieved in that way. The spring shell 18*g* does not have any resilient effect, but rather only a stopping effect with respect to the axial displacement of the bearing.

Figure 42:
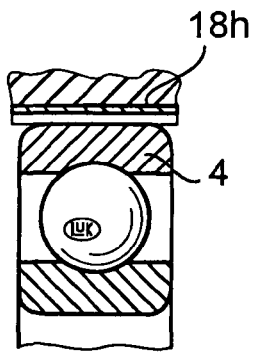
Figure 43:
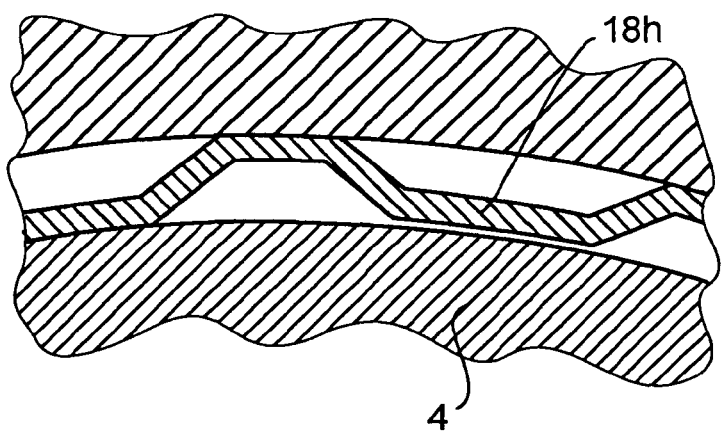

The embodiment in accordance with FIGS. 42 and 43 shows a radial ondular washer 18*h* having a radial undulation with an undulation direction in the circumferential direction, which extends over the entire width of the outer bearing ring 4, and wherein the undulation heights are different. More flexible progressive characteristics can be achieved in that way.

It should be understood that the radial ondular washer 18*h* can be supplemented with side walls to form a spring shell. In addition, not only can the undulation heights be different, but the lengths of the undulations can be different as well.

Figure 44:
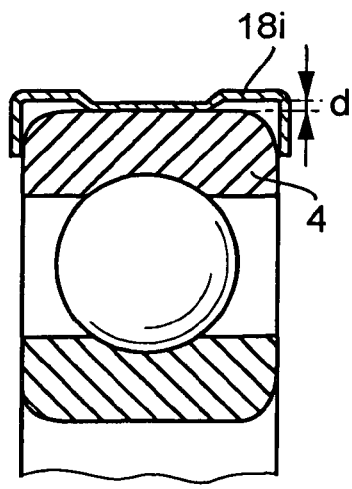
Figure 45:
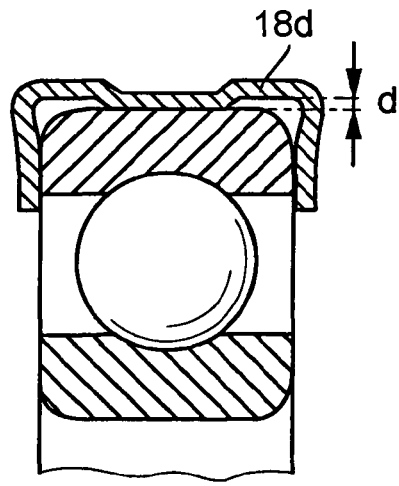

The embodiments in accordance with FIGS. 44 and 45 are similar to that of FIG. 34, wherein the outer surface of the outer bearing ring 4 is formed without a recess or groove, so that the undulation height of the spring shell 18*i* is equal to the possible radial displacement of the bearing. The side walls of the spring shell 18*i* shown in FIG. 44 extend parallel to the side walls of the outer bearing ring 4, so that the spring shell 18*i* does not function as an axial spring. The spring shell 18*d* of FIG. 45 corresponds to that of FIG. 34, that is, the spring shell 18*d* additionally functions as an axial spring.

Figure 46:
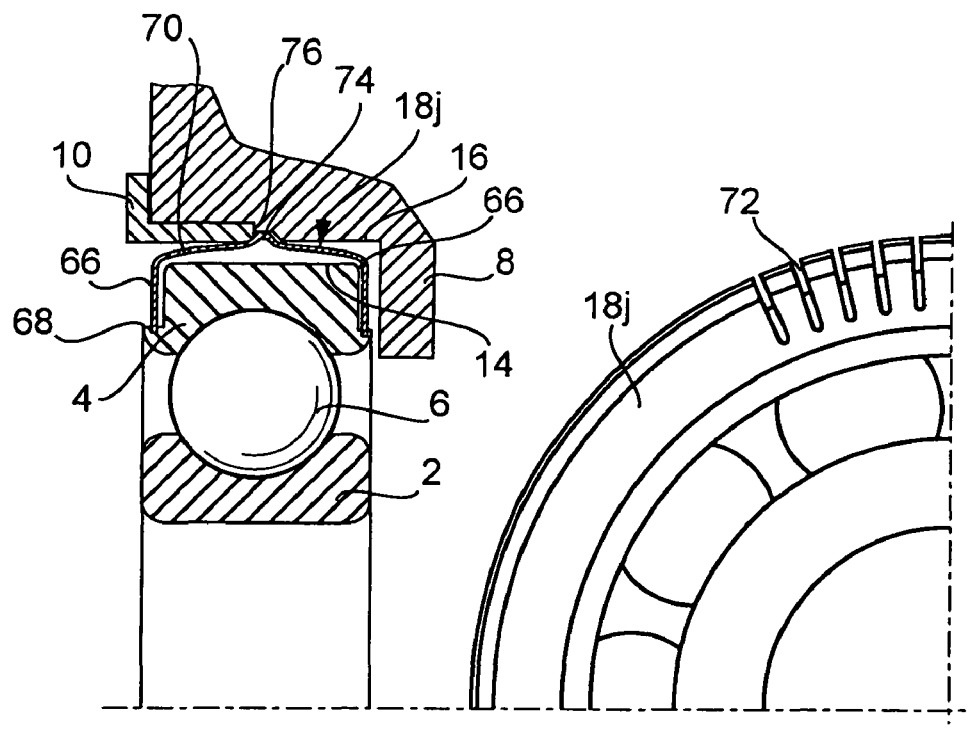
FIGS. 46 and 47 show partial sectional views and partial side views of two further embodiments of radial ondular washers.

FIG. 46 illustrates in the left side of the figure in longitudinal section and in the right side of the figure in side view a further embodiment of a radial ondular washer that is configured in the form of a spring shell. The outer bearing ring 4 is enclosed by a spring shell 18*j* made from a sheet of spring steel and has an overall U-shaped cross section, and whose radial side walls 66 are supported radially on an annular step 68, which is formed on the side face of the outer bearing ring 4. Radial flexibility is achieved by means of a curved cross-sectional shape or a radially-outwardly-extending arch in the base 70 of the spring shell 18*j*. The basic stiffness can be influenced via the sheet thickness. The spring characteristic can be selected by choosing the curvature profile of the base, possibly with multiple undulations, and/or the contour of the side walls 66, in accordance with the intended purpose. For example, the spring characteristic can be influenced so that the base 70 comes into contact with the outer surface of the outer bearing ring 4 after a specific radial deformation. Moreover, the axial flexibility of the spring shell 18*k* can be influenced by a corresponding form of the side walls 66 and the adjacent side surfaces of the outer bearing ring 4. The radial side walls 66 can also contribute to the radial flexibility of the spring sleeve 18*j* via an asymmetrical curvature within their plane.

An increase in flexibility in the circumferential direction can be achieved via axially-extending radial slots 72 that pass through the base 70 and extend into part of the side walls 66 of the spring shell 18*j*. Its radial flexibility is also increased by interrupting the membrane stresses in the outer surface, or base, of the spring shell 18*j*.

Because the radial side walls 66 extensively encompass or surround the outer bearing ring 4, the radial demand for space is minimized on the one hand, and a relatively high axial flexibility is made possible on the other hand. A slipping off of the side walls 66 away from the outer bearing ring and along annular step 68 can be prevented, if required, by forming the step 68 with a corresponding undercut. The spring shell 18*j* does not have to extend as one piece over the entire periphery of the outer bearing ring 4. It can be in the form of two peripheral segments. In the installed state, the unity of the spring sleeve is ensured by the accommodating bore or recess in the housing 8, wherein the installation of the spring shell is facilitated by its curved shape.

A circumferentially-extending radial protrusion 74 of the spring shell 18*j*, which engages with an annular groove 76 formed in the housing 8, can serve for axially securing the bearing. The annular groove 76, which is formed on the inner surface 16 of the housing 8, can be provided by a grade or slope, which is laterally closed off by the annular cover 10 of the type shown in FIG. 1 and that is attached to the housing 8.

It should be understood that in the case wherein small forces are to be absorbed, the spring shell 18*j* can be radially formed in such a way in terms of flexibility, that it can be pressed from the side into the housing together with the inner bearing ring 2 and the outer bearing ring 4 and the roller elements 6 arranged between them, so that the radial protrusion 74 can extend into annular groove 76 in inner surface 16 of housing 8.

Figure 47:
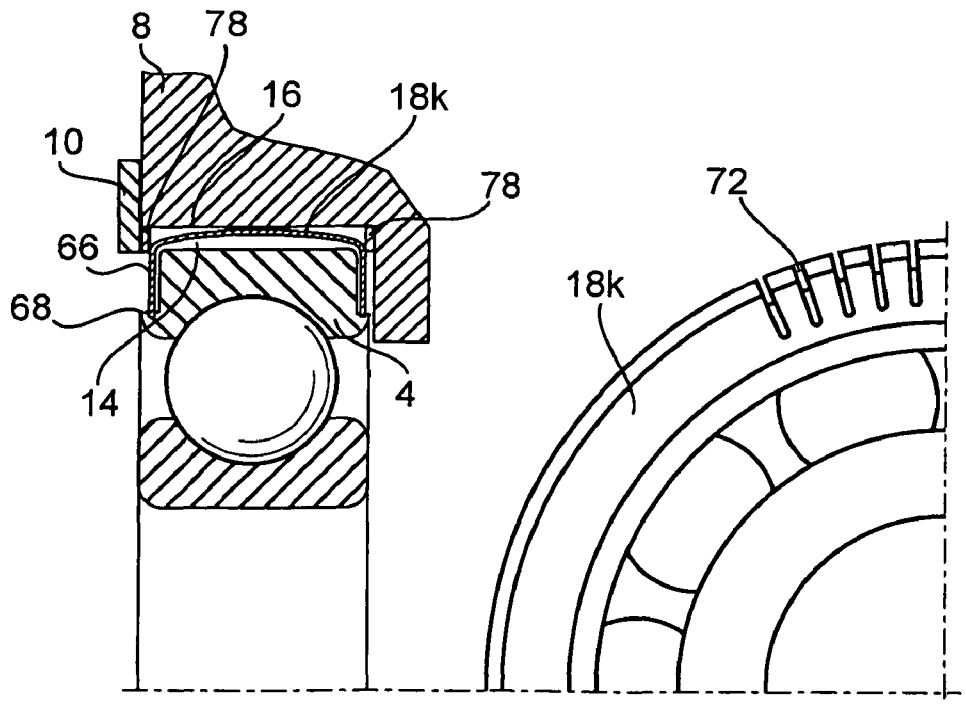

The embodiment of FIG. 47 differs from that in FIG. 46 primarily in that the axial securing of the spring shell 18*k* occurs via the side surfaces of annular spacers 78, by means of which the spring shell 18*k* is supported on a radial side surface of the housing 8 and by the correspondingly formed annular cover 10. The spacers 78 can be made of plastic, for example. An axial pinching of the spring shell 18*k* as a consequence of a radial displacement can be prevented, if required, by means of an axial clearance, which can be very small, however.

Figure 48:
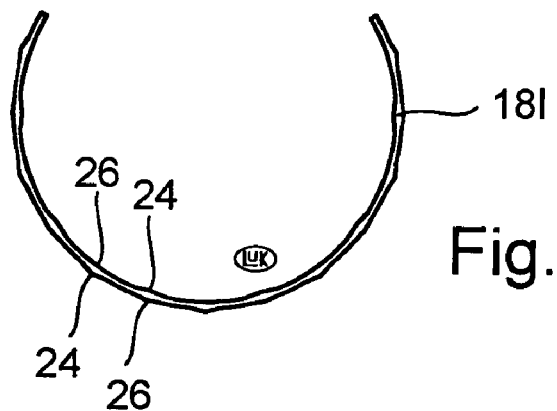
FIG. 48 shows an end view of a radial ondular washer segment of the type shown in FIGS. 49 and 50.
Figure 49:
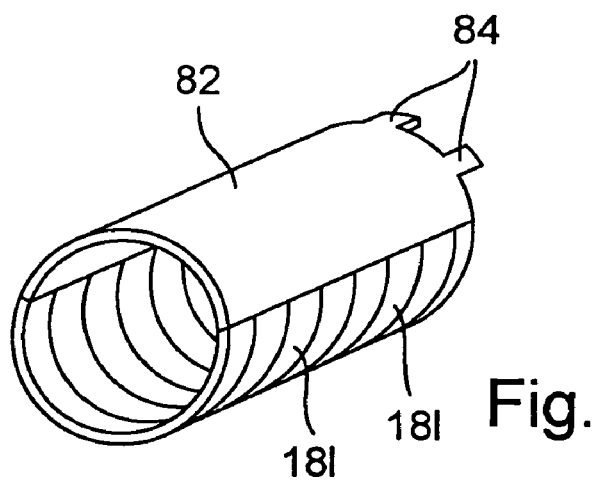
FIGS. 49 and 50 show perspective views of two different arrangements of radial ondular washer segments with positioning components.
Figure 50:
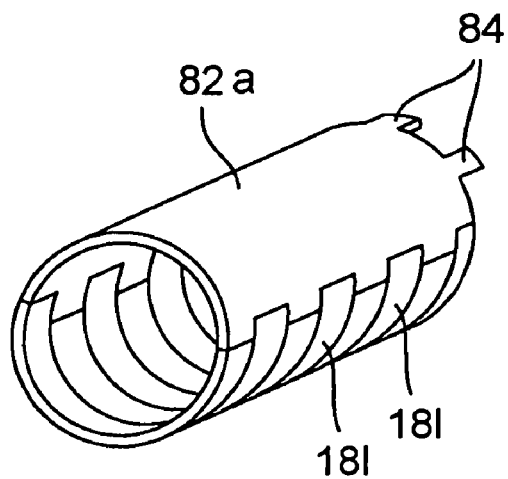

FIGS. 48 through 50 illustrate embodiments of the decoupling device that work with radial ondular washer segments that do not completely surround the outer bearing ring 4 (FIG. 1), which is not illustrated in FIGS. 48 through 50, but only along a circumferential region of, for example, approximately 180°, and that are arranged on the load-bearing side of the outer bearing ring.

FIG. 48 shows an end view of a radial ondular washer segment 18*l* that extends over more than half of the periphery and is configured similarly with regard to its undulations as, for example, the radial ondular washer 18*b* of FIG. 4. As shown in FIG. 49, several radial ondular washer segments 18*l* are arranged axially side by side around the outer bearing ring of the bearing (not shown). A positioning element 82, which can be in the form of a sleeve segment in such a way that together with the radial ondular washer segments 18*l* the outer bearing ring is completely surrounded, serves for positioning the radial ondular washer segments 18*l* in the circumferential direction. For securing it in the circumferential direction, the positioning element 82 has axial extensions 84, which engage in recesses (not shown) that are formed on the housing 8 (FIG. 1). In the embodiment in accordance with FIG. 49 the positioning element 82 is formed in such a way that all the radial ondular washer segments 18*l* are arranged axially side by side without circumferential offset.

In the embodiment in accordance with FIG. 50, the positioning element 82*a* is provided with circumferential recesses and projections on its longitudinally-extending ends so that adjacent radial ondular washer segments 18*l* are arranged offset from adjacent washer segments in the circumferential direction. That arrangement is advantageous to ensure that the supporting humps 24 and stop humps 26 that can be seen in FIG. 48 (see FIG. 4 for more details), are offset and arranged at gaps.

One advantage that is achieved with the embodiments in accordance with FIGS. 48 through 50 is that the utilization of, for example, expensive stamping sheets for the radial ondular washers is clearly improved compared with the configuration of radial ondular washers that extend over the entire periphery (if provided with a slot).

The patent claims that are submitted with the patent application are formulation proposals without prejudice for achieving more extensive patent protection. The applicants reserve the right to claim yet other combinations of features that were previously only disclosed in the specification and/or the drawings.

The references made in the dependent claims indicate a further development of the object of the main claim by way of the features of the dependent claim in question; they are in no way to be understood to mean an abandonment of the attainment of independent object-related patent protection for the combinations of features of the referenced dependent claims.

Since the objects of the dependent claims can constitute separate and independent inventions with reference to the prior art on the priority date, the applicant reserves the right to make these the object of independent claims or divisional applications. They can also contain independent inventions that have a configuration that is independent from the objects of the preceding dependent claims.

The exemplary embodiments are not to be understood to constitute a limitation of the invention. Rather, numerous alterations and modifications are possible within the scope of the present disclosure, in particular those variants, elements, and combinations, and/or materials that can be deduced by the person skilled in the art for attaining the object of the invention by combining or modifying, for example, features and elements or process steps described in the general specification, the embodiments as well as the claims, and illustrated in the drawings, and which can lead to a new object or to new process steps or process step sequences, also insofar as they concern production, testing, and operating methods.

What is claimed is:

1. A decoupling device for a bearing arrangement for rotatably supporting a shaft in a housing, said decoupling device comprising
an annular outer bearing ring configured with a circularly cylindrical outer surface and radially-extending lateral surfaces, within which bearing ring the shaft is rotatably mounted,
a housing inner surface that surrounds the bearing ring outer surface,
wherein at least one radially elastically deformable ondular washer is positioned between the bearing ring outer surface and the housing inner surface and which ondular washer allows a limited relative radial movement between the housing inner surface and the bearing ring outer surface, wherein on the outer surface and the radially-extending lateral surfaces of the bearing ring is fitted an annular spring sleeve that forms the radially elastically deformable ondular washer and has an overall U-shaped cross section that includes an axially-extending base having radially outwardly curving axial ends, and wherein an annular region of the ondular washer projects between the radially-extending lateral surfaces into a peripheral recess of the outer surface of the bearing ring.

2. A decoupling device in accordance with claim 1, wherein the base of the ondular washer has at least two axially spaced peripheral radial undulations having an axial wavelength direction.

3. A radial ondular washer for enclosing at least part of the periphery of a an annular bearing ring configured with a circularly cylindrical outer surface and radially-extending lateral surfaces adjacent thereto, said ondular washer comprising: a unitary spring sleeve having a U-shaped cross section that encloses at least one peripheral segment of the bearing ring, and wherein the spring sleeve includes a generally axially-extending linear base that includes at least one elastically deformable arched region at an axial end of the base, wherein the arched region has a height that limits radial displacement of the bearing ring relative to a surrounding bearing housing.

4. A radial ondular washer in accordance with claim 3, wherein the base includes a radial projection that extends in the peripheral direction of the ondular washer and defines the at least one arched region, and wherein the arched region extends laterally outwardly beyond an adjacent radially-extending lateral surface of the bearing ring to allow axial movement of the bearing ring relative to the ondular washer by the washer functioning as an axial spring element.

* * * * *